United States Patent
Shkapenyuk et al.

(10) Patent No.: US 8,713,149 B2
(45) Date of Patent: Apr. 29, 2014

(54) DATA FEED MANAGEMENT

(75) Inventors: Vladislav Shkapenyuk, New York, NY (US); Theodore Johnson, New York, NY (US); Divesh Srivastava, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 226 days.

(21) Appl. No.: 13/219,744

(22) Filed: Aug. 29, 2011

(65) Prior Publication Data

US 2013/0054769 A1 Feb. 28, 2013

(51) Int. Cl.
*G06F 15/173* (2006.01)

(52) U.S. Cl.
USPC .............................. 709/223; 709/203; 709/226

(58) Field of Classification Search
USPC .......................................... 709/203, 223, 226
See application file for complete search history.

(56) References Cited

U.S. PATENT DOCUMENTS

| | | | |
|---|---|---|---|
| 6,816,878 B1 * | 11/2004 | Zimmers et al. .............. | 709/200 |
| 8,121,915 B1 * | 2/2012 | Igoe et al. ....................... | 705/35 |
| 8,200,775 B2 * | 6/2012 | Moore ........................... | 709/217 |
| 2002/0152245 A1 * | 10/2002 | McCaskey et al. ........... | 707/530 |
| 2006/0026067 A1 * | 2/2006 | Nicholas et al. ................ | 705/14 |
| 2006/0136560 A1 * | 6/2006 | Jiang ............................. | 709/206 |
| 2008/0207181 A1 * | 8/2008 | Jiang ........................... | 455/414.1 |
| 2008/0214148 A1 * | 9/2008 | Ramer et al. ............... | 455/414.1 |
| 2011/0083037 A1 * | 4/2011 | Bocharov et al. ............ | 714/4.11 |

OTHER PUBLICATIONS

Shkapenyuk et al., "Bistro Data Feed Management System," Proceedings of the 2011 international conference on Management of data, Jun. 12-16, 2011.

* cited by examiner

*Primary Examiner* — Phuoc Nguyen

(74) *Attorney, Agent, or Firm* — Hartman & Citrin LLC

(57) ABSTRACT

The present disclosure is directed to systems, methods, and computer-readable storage media for data feed management. Data feeds can be received at one or more landing directories associated with a feed management system. The feed management system can be configured to map the data feeds in the landing directories to one or more subscribers, and the data feeds can be moved to one or more staging directories associated with the subscribers. The data feeds can be delivered to the one or more subscribers from the staging directories. Receipts indicating delivery of the data feeds can be stored by the feed management system. The feed management system can be configured to manage data feeds, landing directories, and staging directories.

16 Claims, 5 Drawing Sheets

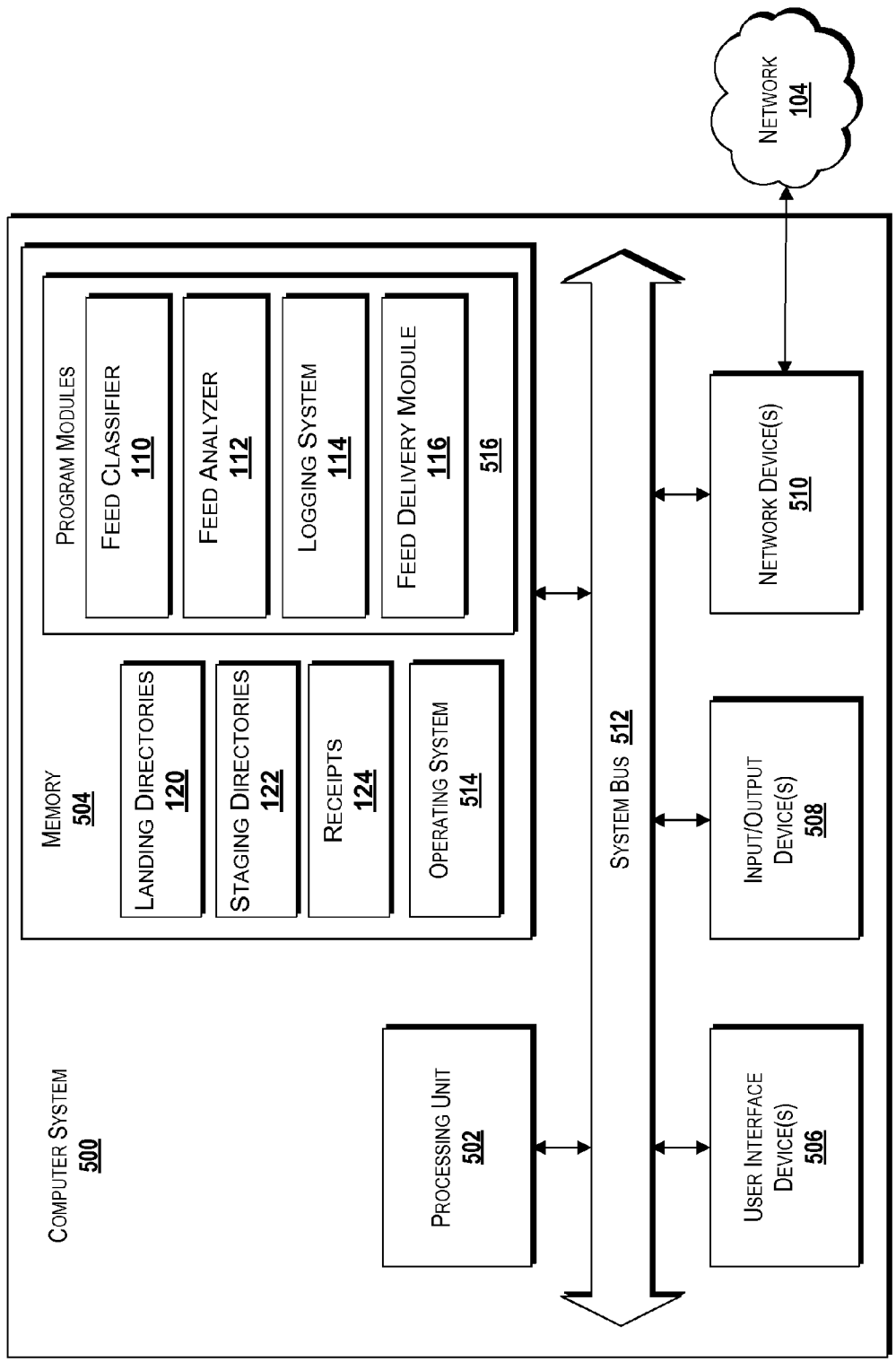

DATA FEED MANAGEMENT

BACKGROUND

This disclosure relates generally to data management. More specifically, the disclosure provided herein relates to data feed management.

Data feed management has become important for entities relying upon and/or offering data applications. These data applications often depend upon reliable data delivery to support data collection, data correlation, and analysis of the collected and/or correlated data. The data consumed by these data applications may be collected from a wide variety of sources and organizations, each of which may use varied mechanisms for tracking and/or delivering the data to the consumers or subscribers. For example, some data are streamed in real time to the data applications, while other data are obtained at intervals or collected in an on-demand or ad hoc manner by the data applications.

Because of these varied mechanisms for tracking and delivering data, individual data applications may make individually-tailored arrangements with data providers to subscribe to data feeds or data sources. Thus, subscribers often are not aware of a structure of incoming data streams or data files. As such, the subscribers often must determine or discover the structure of the data streams or data files. Discovery of the file structure can be a difficult process, and may need to be completed by each subscriber that joins or subscribes to a feed.

Some organizations generate the data feeds and subscribe to the data feeds as part of their internal operations. For example, a network operator may generate a wide variety of continuous streams of data files from operations at geographically distributed locations, and may stream these data to a monitor system for correlation and analysis for understanding and controlling its operations.

Because the data sources may be geographically dispersed and may be sporadically connected to a network, collection of these data in an efficient and reliable manner can be difficult. Furthermore, some or all of the data streams may be relevant to some analysts in one geographic location, while other data streams may be relevant to other analysts in another geographic location. Delivering the relevant data feeds to the relevant entities for analysis is a tedious, time-consuming, and difficult task.

SUMMARY

The present disclosure is directed to data feed management. In some embodiments, a feed management system is configured to receive data feeds at one or more landing directories associated with one or more sources of the data feeds ("data sources"). The feed management system can be configured to map the data feeds in the landing directories to one or more subscribers, and the data feeds can then be moved to staging directories associated with the one or more subscribers to which the data feeds have been mapped. In some embodiments, the mapping of the data feeds from the landing directories to the subscribers can be based upon analysis of a filename and/or data structure associated with the data feeds. The data feeds can be delivered to one or more subscribers from the staging directories. Receipts indicating delivery of the data feeds can be stored by the feed management system.

According to various embodiments disclosed herein, if one or more subscribers are not identified during the mapping, the feed management system can be configured to determine if a matching subscriber has been missed due to a false negative. As used herein, a "false negative" is a mistake made during the mapping process that results in a matching subscriber not being identified by the feed management system. If a matching subscriber is identified, the feed management system can be configured to determine if the subscriber has been mismatched due to a false positive match. As used herein, a "false positive match" is a mistake made during the mapping process that results in a matching subscriber being mistakenly identified by the feed management system when another or no subscriber actually matches. If a false positive match or a false negative is determined to exist, the feed management system can be configured to create recommendations or suggestions for subscribers to modify the mapping such that the data feed will be properly mapped to the subscriber and/or to modify the mapping such that the data feed will no longer result in mapping from the landing directory to the subscriber. The feed management system also can be configured to periodically analyze matched or mismatched data files to determine if the data files correspond to new data feeds.

According to an aspect of the concepts and technologies disclosed herein, a computer-implemented method for managing a data feed is disclosed. The method includes computer-implemented operations at least for receiving the data feed at a landing directory associated with a feed management system, mapping the data feed at the landing directory to a subscriber, moving the data feed to a staging directory associated with a subscriber, and attempting to deliver the data feed to the subscriber via the staging directory. The method also includes storing data indicating delivery of the data feed, in response to detecting delivery of the data feed to the subscriber.

In some embodiments, the method includes archiving the data feed in response to detecting delivery of the data feed. The data feed can be archived at an archiver in communication with the feed management system. In response to detecting a failed delivery of the data feed, placing the data feed in a delivery queue associated with the subscriber for another delivery attempt. In some instances, mapping the data feed includes determining if the landing directory is associated with the subscriber. In response to determining that the landing directory is associated with the subscriber, the method can include determining if matching the subscriber to the landing directory corresponds to a false positive match. In response to determining that the landing directory is not associated with the subscriber, the method can include determining if the failure to match the subscriber to the landing directory corresponds to a false negative.

In some embodiments, determining if the matched subscriber corresponds to the false positive match includes analyzing the data feed, comparing the data feed to a further data feed of the matched subscriber, and determining that the data feed and the further data feed do not share a filename format and data structure. In some embodiments, determining if failure to identify the matched subscriber corresponds to the false negative includes analyzing the data feed, comparing the data feed to a further data feed in a further staging directory, and determining that the data feed and the further data feed share a filename format and data structure. The method further can include moving the data feed to the matched staging directory, in response to determining that the matched staging directory does not correspond to the false positive match. The method also can include creating a recommendation for the subscriber in response to determining that the mapped subscriber corresponds to the false positive match, the recommendation including a suggestion to modify the mapping to remove an association between the data feed and the subscriber. In some embodiments, the method includes determining if the data feed corresponds to a new data feed. The method also can include creating a recommendation for the subscriber in response to determining that the failure to identify the subscriber corresponds to the false negative, the recommendation including a suggestion to modify the mapping to include an association between the landing directory and the subscriber.

According to another aspect of the concepts and technologies disclosed herein, a system is disclosed. The system includes a data source configured to provide a data feed to a feed management system and an archiver in communication with the feed management server. The archiver can be configured to store a feed archive and the feed management system can include a processor configured to execute computer executable instructions. Execution of the computer executable instructions by the processor can cause the feed management system to receive the data feed at a landing directory associated with the feed management system, map the data feed at the landing directory to a subscriber in communication with the feed management system, move the data feed to a staging directory associated with a subscriber, add the data feed to a delivery queue associated with the subscriber, and attempt to deliver the data feed to the subscriber via the staging directory. In response to detecting a failure to deliver the data feed to the subscriber, the feed management system can add the data feed to the delivery queue, and in response to detecting delivery of the data feed to the subscriber, the feed management system can store a receipt including data indicating delivery of the data feed.

In some embodiments, the processor is further configured to execute computer executable instructions for archiving the data feed at the archiver in communication with the feed management system, receiving a subscription request from a further subscriber, and providing the data feed to the subscriber, in response to receiving the subscription request. The mapping of the data feed can include determining if the landing directory is associated with a subscriber, in response to determining that the landing directory is associated with the subscriber, determining if the matched subscriber corresponds to a false positive match, and in response to determining that the landing directory is not associated with the subscriber, determining if the failure to identify the matched subscriber corresponds to a false negative.

In some embodiments, execution of the instructions by the processor further can cause the feed management system to create a recommendation for the subscriber in response to determining that the matched subscriber corresponds to the false positive match, the recommendation including a suggestion to modify the mapping to remove the association between the data feed and the subscriber. Execution of the instructions by the processor further can cause the feed management system to create a recommendation for the subscriber in response to determining that the failure to identify the subscriber corresponds to the false negative, the recommendation including a suggestion to modify the mapping to add an association between the data feed and the subscriber.

According to yet another aspect of the concepts and technologies disclosed herein, another computer-implemented method for managing a data feed is disclosed. The method includes computer-implemented operations at least for receiving a data feed at a landing directory associated with a feed management system, mapping the data feed at the landing directory to a subscriber in communication with the feed management system, moving the data feed to a staging directory associated with the subscriber, adding the data feed to a delivery queue associated with the subscriber, and attempting to deliver the data feed to the subscriber, the data feed being delivered to the subscriber according to a delivery schedule determined based upon a responsiveness of the subscriber. The method also includes again adding the data feed to the delivery queue for a further delivery attempt, in response to detecting a failure to deliver the data feed to the subscriber, and storing a receipt including data indicating delivery of the data feed, in response to detecting delivery of the data feed to the subscriber.

In some embodiments, the delivery schedule is based, at least partially, upon a group of subscribers to which the subscriber belongs, and a delivery algorithm associated with the group of subscribers. In other embodiments, the delivery schedule includes delivering the data feed in an order in which the data feed is received at the feed management system.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure, and be protected by the accompanying claims.

BRIEF DESCRIPTION OF THE DRAWINGS

FIG. 5 is a block diagram illustrating an example computer system configured to enable data feed management, according to some illustrative embodiments.

DETAILED DESCRIPTION

The following detailed description is directed to methods, systems, and computer-readable media for data feed management. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
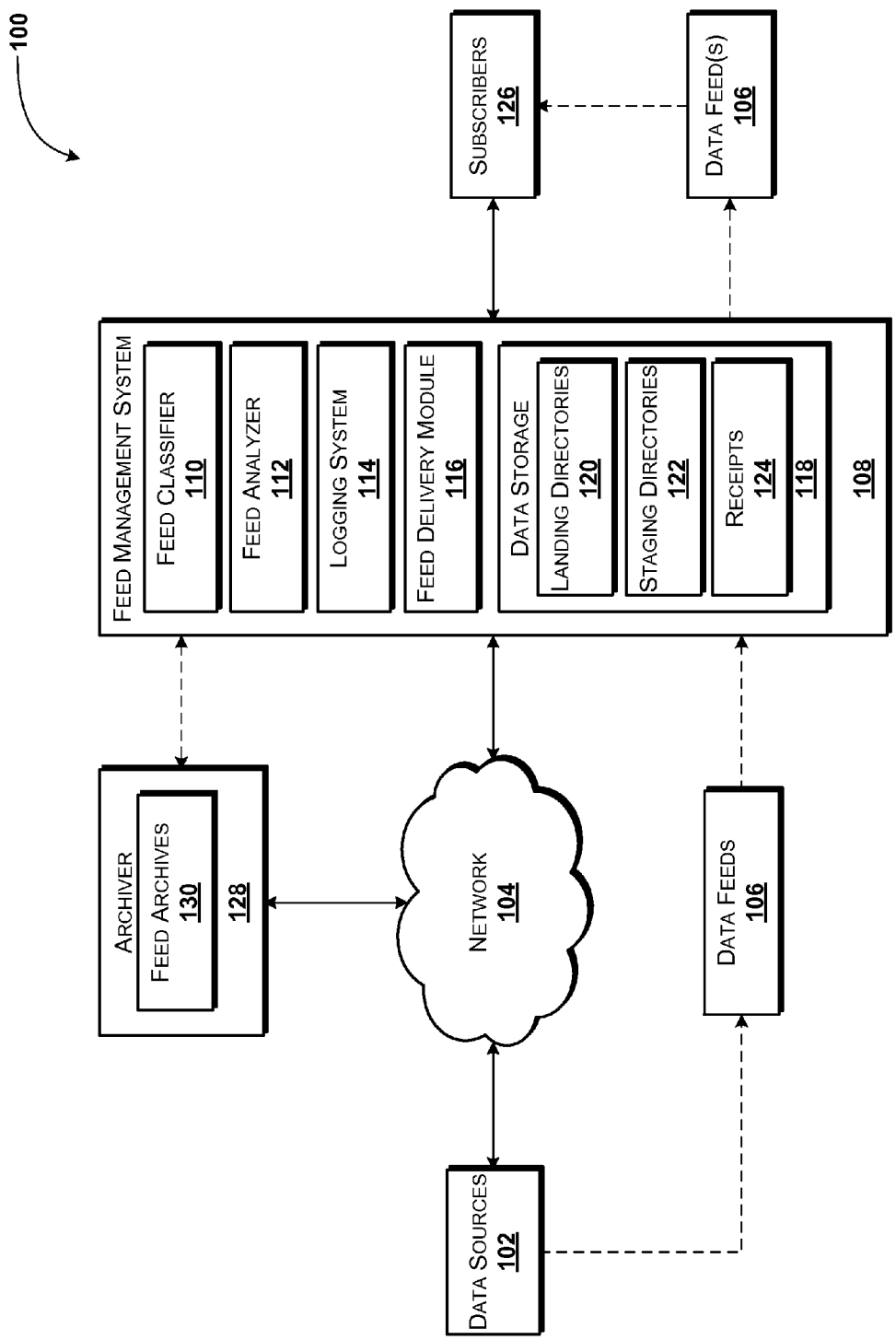
FIG. 1 is a system diagram illustrating an illustrative operating environment for the various embodiments presented herein.

Referring now to FIG. 1, aspects of an illustrative operating environment 100 capable of providing the various embodiments presented herein will be described. The operating environment 100 shown in FIG. 1 includes one or more data sources 102. According to various embodiments, the functionality of the data sources 102 described herein may be provided by one or more server computers, databases, datastores, computer readable media (as defined herein), desktop computers, mobile telephones, laptop computers, other computing systems, and the like. The data sources 102 can be configured to operate on or in communication with a network 104. An illustrative network 104 is described in more detail below with reference to FIG. 4.

As illustrated in FIG. 1, the data sources 102 store, host, or stream one or more data files, data sets, data feeds, or streams of data ("data feeds") 106. The data feeds 106 can be stored, streamed, or provided in almost any format including tables, matrices, text formats, tab- or other-character-delimited text formats, other formats, and the like. In some illustrative embodiments, the data feeds 106 are streamed from the data sources 102 or are published by the data sources 102 at various times. The data feeds 106 can include any type of data. In some embodiments, the data feeds 106 are subscribed to by one or more entities for analysis, or may be sold to, shared with, or released to various entities who may subscribe to the data feeds. In the illustrated embodiment, the data feeds 106 are provided to a feed management system 108 that operates on or in communication with the network 104. Thus, it should be understood that the feed management system 108 can subscribe to a data feed 106 provided by the data source 102. It should be understood that this embodiment is illustrative, and should not be construed as being limiting in any way.

The data sources 102 can be configured to communicate with the feed management system 108 via the network 104 and/or via a direct link. The functionality of the feed management system 108 can be provided by one or more personal computers ("PC's"), server computers, server farms, virtual computing resources, combinations thereof, and the like. According to various embodiments, the feed management system 108 is configured to execute an operating system (not illustrated) and one or more application programs such as, for example, a feed classifier 110, a feed analyzer 112, a logging system 114, a feed delivery module 116, and/or other application programs. The operating system is a computer program for controlling the operation of the feed management system 108. The application programs are executable programs configured to execute on top of the operating system to provide the functionality described herein for enabling data feed management.

The feed management system 108 also can be configured to store data used by the feed management system 108. In the illustrated embodiment, the feed management system 108 includes a data storage 118, which can be provided by one or more memory modules, one or more hard disk drives, and/or other data storage mechanisms such as the various forms of computer storage media described hereinbelow. In the illustrated embodiment, the data storage 118 stores one or more landing directories 120, one or more staging directories 122, and one or more receipts 124, which are described in more detail below. In FIG. 1, the feed classifier 110, the feed analyzer 112, the logging system 114, and the feed delivery module 116 are illustrated as being stored outside of the data storage 118. It should be understood, however, that computer executable instructions for each of these entities can be stored in the data storage 118 as well. As such, it should be understood that the embodiment shown in FIG. 1 is illustrative, and should not be construed as being limiting in any way.

As will be described in more detail below, the feed management system 108 is configured to receive and aggregate data feeds 106, and to provide the data feeds 106 to one or more entities in communication with the feed management system 108 and/or the network 104. For purposes of simplifying the description of the various concepts and technologies disclosed herein, the entities to which the data feeds 106 are provided herein are described and illustrated in FIG. 1 as one or more subscribers 126 shown as communicating with the feed management system 108. It should be understood that these embodiments are illustrative, and should not be construed as being limiting in any way.

It should be understood that the feed management system 108 can communicate with the subscribers 126 via one or more network connections including, but not limited to, the network 104. As noted above, the subscribers 126 can, but do not necessarily, correspond to one or more data applications. The data applications can be configured to consume data from the data feeds 106 to provide various functions. As such, it should be understood that the functionality of the subscribers 126 can be provided by one or more data storage devices and/or computing devices, and that the subscribers 126 can execute one or more data applications, those these data applications are not shown in FIG. 1.

The feed classifier 110 is configured to classify the incoming data feeds 106. According to various implementations, the data sources 102 are configured to deposit the data feeds 106 in one or more of the landing directories 120. More particularly, the feed management system 108 is configured, in some embodiments, to provide one or more landing directories 120 specific to each data source 102 and/or data feed 106. Thus, the data feeds 106 can be deposited into one or more of the landing directories 120 and thereby associated with one or more of the data sources 102. In some embodiments, the feed classifier 110 is configured to obtain the data feeds 106 from the landing directories 120, and map the data feeds 106 from the landing directories 120 to one or more subscribers 126 associated with the landing directories 120 via mapping information, and to move the data feeds 106 to one or more related staging directories 122 from which the data feeds 106 are provided to, or obtained by the subscribers 126. As such, the feed classifier 110 is configured, in various implementations, to determine when the data feeds 106 have been published due to the deposit of the data feeds 106 at the landing directories 120. The feed classifier 110 also can be configured to analyze the data feeds 106 to determine the corresponding subscribers 126, i.e., subscribers 126 that subscribe to the data feeds 106.

According to various embodiments, the feed classifier 110 is configured to classify the data feeds 106 based, at least partially, upon filename patterns associated with the data feeds 106. For example, if a data feed 106 is represented by a file entitled "CPU_POLLER1_08012011," the feed classifier 110 can determine that the data feed 106 corresponds to a first CPU poller, and that the data feed 106 corresponds to data captured on Aug. 1, 2011. As such, the feed classifier 110 can map the data feed 106 to one or more subscribers 126 requesting data relating to the identified CPU poller and can move the data feed 106 to one or more staging directories 122 associated with the identified subscribers 126 requesting this data. It should be understood that this embodiment is illustrative, and should not be construed as being limiting in any way.

In some instances, classifying the data feeds 106 based upon filename patterns is sufficient to properly classify the data feeds 106. In other instances, however, basing classification of the data feeds 106 upon the filenames is insufficient as the compositions of the data feeds 106 can be changed due to data feed evolution such as changes in compositions of the data feeds 106, changes in file naming conventions and data formats for the data feeds 106, and/or other changes in the filenames used for the data feeds 106. Furthermore, even agreed-upon file naming conventions between data sources 102 and the feed management system 108 may be incorrectly applied to the data feeds 106 and therefore may generate false positive matches or false negatives.

As used herein, a "false positive match" is a mistake that occurs during mapping of the data feed 106 to the subscribers 126. This false positive match can occur due to the feed classifier 110 incorrectly determining the data feed 106 as being relevant to a particular data source 102 and/or landing directory 120, and as such a particular subscriber 126. Thus, the feed classifier 110 may place the data feed 106 into a staging directory 122 associated with a particular subscriber 126, and/or corresponding to a particular landing directory 120 associated with a particular data source 102, though in reality the data feed 106 was provided by another data source 102 and/or should be designated for delivery to a different subscriber 126.

Similarly, a "false negative" is a mistake that occurs during mapping of the data feed 106 to the subscribers 126. This false negative can occur due to the feed classifier 110 incorrectly determining that the data feed 106 does not relate to a particular data source 102 and/or landing directory 120. As such, the feed management system 108 may fail to move the data feed 106 to a staging directory 122 associated with a particular subscriber 126 and/or corresponding to a particular landing directory 120 associated with a particular data source 102. According to various embodiments of the concepts and technologies disclosed herein, the feed management system 108 executes the feed analyzer 112 to identify false positive matches, false negatives, and/or to discover data feeds 106 for which a subscriber 126 has not been designated.

As mentioned briefly above, the feed analyzer 112 is configured to identify false negatives, false positive matches, and new data feeds 106. With regard to false negatives, data feeds 106 that have not been identified as being associated with a particular subscriber 126, the feed analyzer 112 performs an enhanced analysis of the data feed 106 to identify structural similarities and/or filename pattern similarities between the data feed 106 and other data feeds 106 that have been matched to various subscribers 126 and/or moved to various staging directories 122. If the feed analyzer 112 identifies another data feed 106 to which the unmatched data feed 106 appears to be similar, the feed analyzer 112 can generate a recommendation or suggestion for review by another entity such as, for example, a subscriber 126. The recommendation can include a recommendation to modify the mapping such that the data feeds 106 are mapped to the subscriber 126 in the future. As such, the feed analyzer 112 can be configured not to modify the mapping of the data feeds 106 to particular subscribers 126 and/or to determine if false negatives are, in fact, false negatives. Rather, these decisions can be deferred to other entities for verification, in some embodiments. If no matches are determined by the feed analyzer 112, the feed analyzer 112 can determine if the unmatched data feed 106 is a new data feed 106, as will be described below.

With regard to false positive matches, the feed analyzer 112 can be configured to perform an enhanced analysis of the data feeds 106 that have been identified as being associated with a particular subscriber 126. In some embodiments, the feed analyzer 112 is configured to analyze a particular data feed 106 to identify structural dissimilarities between the particular data feed 106 and other data feeds 106 within the staging directory 122 associated with the subscriber 126 to which the particular data feed 106 has been matched. The feed analyzer 112 can analyze the particular data feed 106 to identify data feeds 106 that do not share the same filename pattern and/or data structure with the other data feeds 106 in the staging directory 122. If the feed analyzer 112 determines that the particular data feed 106 does not match the other matched data feeds 106, the feed analyzer 112 can identify the particular data feed 106 as a probable false positive match and can generate a recommendation or suggestion for review by another entity such as, for example, the subscriber 126. As such, the feed analyzer 112 is configured in some embodiments not to modify the mapping of the data feed 106 to the subscriber 126 and/or not to determine that the false positive match is, in fact, a false positive match. Rather, these decisions can be deferred to other entities for verification, if desired.

As mentioned above, the feed analyzer 112 also can be configured to discover new data feeds 106. The feed analyzer 112 can analyze unmatched data feeds 106 and data feeds 106 determined to be false positive matches to determine if the unmatched data feeds 106 correspond to new data sources 102 and/or new subscribers 126. The feed analyzer 112 can generate a list of new data feeds 106 periodically or on-demand, and can provide the list of new data feeds 106 to one or more entities for action. For example, the list of new data feeds 106 can be provided to the subscribers 126 for identification, subscription, or to determine changes made to the file format, filenames, and the like to allow proper identification of the data feeds 106.

The logging system 114 is configured to log decisions made by the feed classifier 110 and the feed analyzer 112. As such, authorized entities can analyze data stored by the logging system 114 to perform root cause analysis of false positive matches, false negatives, unmatched data feeds 106, and/or discovery of new data feeds 106. As such, the logging system 114 can be used to improve the function of the feed analyzer 112 and/or the feed classifier 110, if desired.

The logging system 114 also is configured, in some embodiments, to track the status of the data feeds 106, to monitor delivery or progress of the data feeds 106, for example, to determine if the data feed 106 is delivered in a complete or incomplete state, to detect and correct any errors in the data feeds 106 or the operation of the feed classifier 110 and/or feed analyzer 112 as described above, and/or to generate and deliver alarms if the logging system 114 is unable to correct errors in the data feeds 106, the operation of the feed classifier 110, and/or the feed analyzer 112. As such, the logging system 114 can be used to trigger the feed classifier 110 and/or feed analyzer 112 when the data feeds 106 are deposited at the landing directories 120, if desired. As such, use of the logging system 114 can help the feed management system 108 provide delivery of the data feeds 106 to subscribers almost immediately after receiving the data feeds 106.

The feed delivery module 116 is configured to provide reliable feed delivery for subscribers 126 subscribing to the data feeds 106 from the feed management system 108. More particularly, the feed delivery module 116 is configured to deliver the data feeds 106 to the subscribers 126 in a manner that avoids missed deliveries in the event that a subscriber 126 fails due to software, hardware, and/or network errors at the subscribers and/or at the feed management system 108. According to various embodiments, the feed delivery module 116 is configured to deliver the data feeds 106 according to various schemes.

For example, the feed delivery module 116 can be configured to deliver the data feeds 106 to subscribers 126 in the order in which the data feeds 106 are received by the feed management system 108. In other embodiments, the feed delivery module 116 is configured to deliver the data feeds 106 in real-time or almost real-time, even if this requires simultaneous delivery with backfilling of data feeds 106 as discussed above with regard to retroactive subscriptions to data feeds 106.

According to various implementations, the feed delivery module 116 is configured to partition subscribers 126 into levels based upon determined or perceived responsiveness of the subscribers 126. This responsiveness can be determined by the feed delivery module 116 or another entity, entered by one or more authorized entities, based upon historical performance data, and/or based upon other data or considerations. According to this approach, the feed delivery module 116 allocates system resources associated with the feed management system 108, for example CPU cores, network resources, and the like, to each level of the subscribers 126. Additionally, each level can apply a scheduling scheme appropriate for that level and/or designated by the subscribers 126. According to various implementations, the feed delivery module 116 uses a max benefit algorithm, an earliest deadline first ("EDF") algorithm, a Prioritized-EDF ("EDF-P") algorithm, a Rate Monotonic ("RT") algorithm, and/or other algorithms to govern delivery of the data feeds 106. It should be clear from the above description that each level can use a different, similar, or identical algorithm to other levels, if desired.

The feed delivery module 116 also is configured to allow retroactive subscription to data feeds 106 by the subscribers 126, as discussed herein. According to various implementations of the concepts and technologies disclosed herein, the feed delivery module 116 maintains the receipts 124. The receipts 124 can include, but are not limited to, arrival receipts reflecting delivery of incoming data feeds 106 to the landing directories 120 and delivery receipts reflecting delivery of the data feeds 106 from the staging directories 122 to the subscribers 126. The receipts 124 also can include delivery failure receipts that indicate that data feeds 106 have not been properly delivered to, or obtained by, subscribers 126. In the event of a delivery failure, the feed delivery module 116 can rebuild a delivery queue associated with a subscriber 126. As such, the delivery of the data feed 106 can be reattempted until delivery is accomplished. The feed delivery module 116 also can manage archives and histories associated with data feeds 106.

In particular, in some implementations, the operating environment 100 includes an archiver 128 operating on or in communication with the network 104 and/or the feed management system 108. The functionality associated with the archiver 128 can be provided by one or more memory devices, data storage devices, databases, server computers, desktop computers, mobile telephones, laptop computers, other computing systems, and the like.

In the illustrated embodiments, the functionality of the archiver 128 is provided by a server computer configured to store one or more feed archives 130. It should be understood that this embodiment is illustrative, and should not be construed as being limiting in any way. According to various implementations of the concepts and technologies disclosed herein, the feed archives 130 store received data feeds 106, whether matched or unmatched. The feed archives 130 can be managed and/or used by the feed delivery module 116, as noted above. It can be appreciated that the storage capacity of the feed management system 108 can be, but is not necessarily, limited. As such, the data feeds 106 can be stored in the feed archives 130 for a specified amount of time and/or indefinitely.

In some embodiments, the archiver 128 can be used by the feed management system 108 to support various features. For example, in one embodiment, one or more subscribers 126 can subscribe to a data feed 106 at any time and can retroactively receive data feeds 106 associated with the data feed 106. It can be understood from the above description that the feed delivery module 116 can use the receipts 124 to provide the retroactive subscription functionality described above, for example, by comparing arrival receipts and delivery receipts, though other approaches are contemplated. Thus, while some data feed subscription services support delivery of data feeds 106 after subscription, the feed management system 106 described herein can support retroactive data feed 106 subscriptions.

Additionally, the archiver 128 can store past data feeds 106 to provide a detailed history of the data feeds 106. This history can be, but is not necessarily, used by the feed analyzer 112 when checking for and/or verifying false positive matches, false negatives, and/or new data feeds 106. Furthermore, the receipts 124 can be periodically or continuously stored or archived at the archiver 128, if desired, though the receipts 124 are not illustrated at the archiver 128. It should be understood that these embodiments are illustrative, and should not be construed as being limiting in any way.

FIG. 1 illustrates one or more data sources 102, one network 104, one feed management system 108, one archiver 128, and one or more subscribers 126. It should be understood, however, that various implementations of the operating environment 100 include one data source 102, multiple networks 104, multiple feed management systems 108, multiple archivers 128, and/or one subscriber 126. As such, the illustrated embodiments should be understood as being illustrative, and should not be construed as being limiting in any way.

Figure 2:
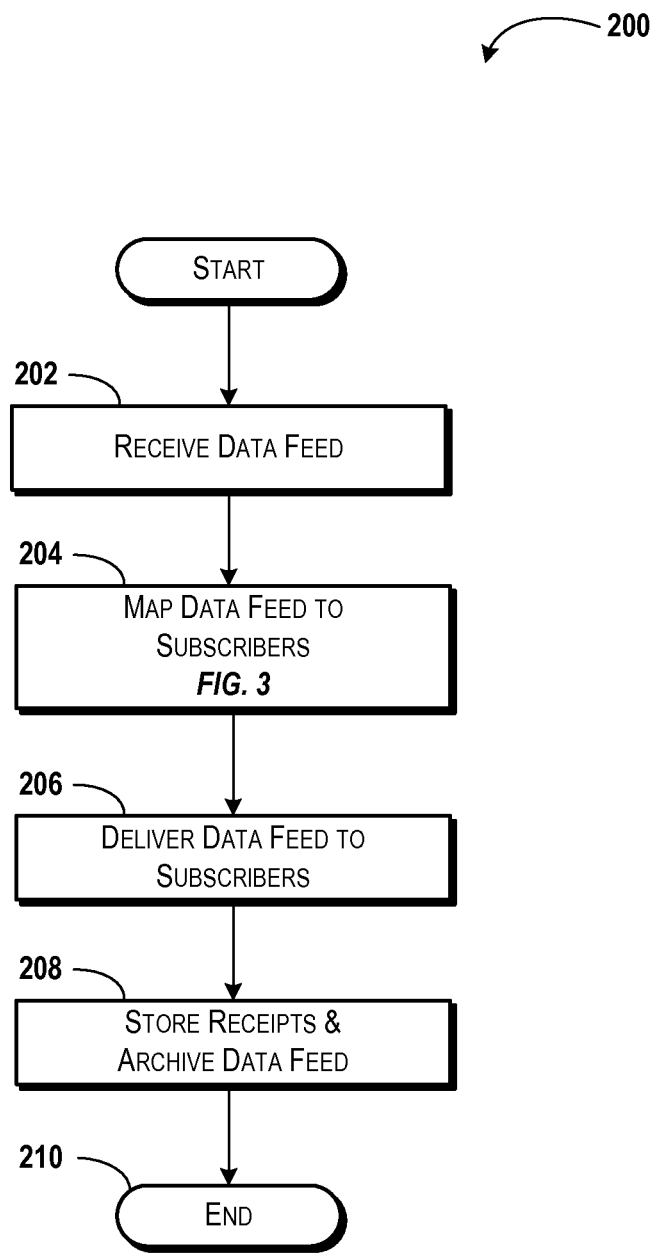
FIG. 2 is a flow diagram showing aspects of a method for data feed management, according to an illustrative embodiment.

Turning now to FIG. 2, aspects of a method 200 for data feed management will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof.

For purposes of illustrating and describing the concepts of the present disclosure, the method 200 is described as being performed by the feed management system 108. It should be understood that the feed management system 108, as well as additional and/or alternative devices and/or network nodes, can provide the functionality described herein via execution of one or more application programs including, but not limited to, the feed classifier 110, the feed analyzer 112, the logging system 114, and/or the feed delivery module 116 and/or via communications with one or more external entities such as the archiver 128. Furthermore, it should be understood that the functionality of the feed management system 108 can be provided by any number of devices or network nodes, and is not limited to the feed management system 108 illustrated in the FIGURES. Thus, the illustrated embodiments are illustrative, and should not be viewed as being limiting in any way.

The method 200 begins at operation 202, wherein the feed management system 108 receives a data feed 106. As explained above with reference to FIG. 1, the feed management system 108 can obtain the data feed 106 from one or more data sources 102 in communication with the feed management system 108 and/or from other data storage locations. In some embodiments, the data feed 106 is transmitted to the feed management system 108, made available to the feed management system 108, and/or otherwise provided to the feed management system 108.

As noted above, the data feed 106 can be received at the feed management system 108 and loaded into or cached one or more landing directories 120. The landing directories 120 can be specified for the one or more data sources 102, if desired. Although not shown in FIG. 2, it should be clear from the above description of FIG. 1 that the feed management system 108 can generate an arrival receipt upon receiving the data feed 106 at the landing directories 120. The arrival receipt can be, but is not necessarily, stored in the data storage 118 as or as a part of the receipts 124. Similarly, arrival of the data feed 106 at the landing directories 120 can trigger other operations of the method 200, and thus can, but does not necessarily, support rapid delivery of the published data feeds 106 by the feed management system 108.

From operation 202, the method 200 proceeds to operation 204, wherein the feed management system 108 maps the data feed 106 received in operation 202 to one or more subscribers 126. As will be discussed in more detail below, the one or more subscribers 126 can be determined based upon mapping data that associate the data feed 106 with one or more subscribers 126 and the landing directory 120 at which the data feed 106 is received, and/or one or more data sources 102. From the above description of FIG. 1, it should be understood that the mapping of operation 204 can, but does not necessarily, include classification of the data feed 106 and analysis of the data feed 106. An illustrative method for performing the classification and analysis of the data feed 106 of operation 204 is described in more detail with reference to FIG. 3. Although not shown in FIG. 2, the data feed 106 also can be moved to a staging directory 122 associated with the one or more subscribers 126 identified during the mapping of operation 204.

From operation 204, the method 200 proceeds to operation 206, wherein the feed management system 108 delivers the data feed 106 to one or more subscribers 126. As explained above with regard to FIG. 1, the data feed 106 can be delivered to the subscribers 126 according to various delivery algorithms or other mechanisms. Furthermore, as explained above, the subscribers 126 can be grouped into one or more levels based upon responsiveness of the subscribers 126, if desired, and each of these groups can be subject to one or more various delivery schedules, algorithms, and/or delivery schemes.

From operation 206, the method 200 proceeds to operation 208, wherein the feed management system 108 stores delivery receipts and archives feed data. According to various implementations, the feed data archived in operation 208 includes the data feeds 106, which can be archived at the archiver 128 as the feed archives 130. Other data associated with the delivery of the data feeds 106 can be, but is not necessarily, maintained and/or stored or archived in operation 208. For example, in some embodiments the feed management system 108 maintains a delivery queue that includes a list of data feeds 106 for delivery to the subscribers 126. This delivery queue can be stored or archived, if desired, and delivery failures can prompt the feed management system 108 to load the delivery queues from the archiver 128 or other data storage location. As such, delivery failures can prompt the feed management system 108 to attempt redelivery of the data feed 106 at another time.

From operation 208, the method 200 proceeds to operation 210. The method 200 ends at operation 210.

Figure 3:
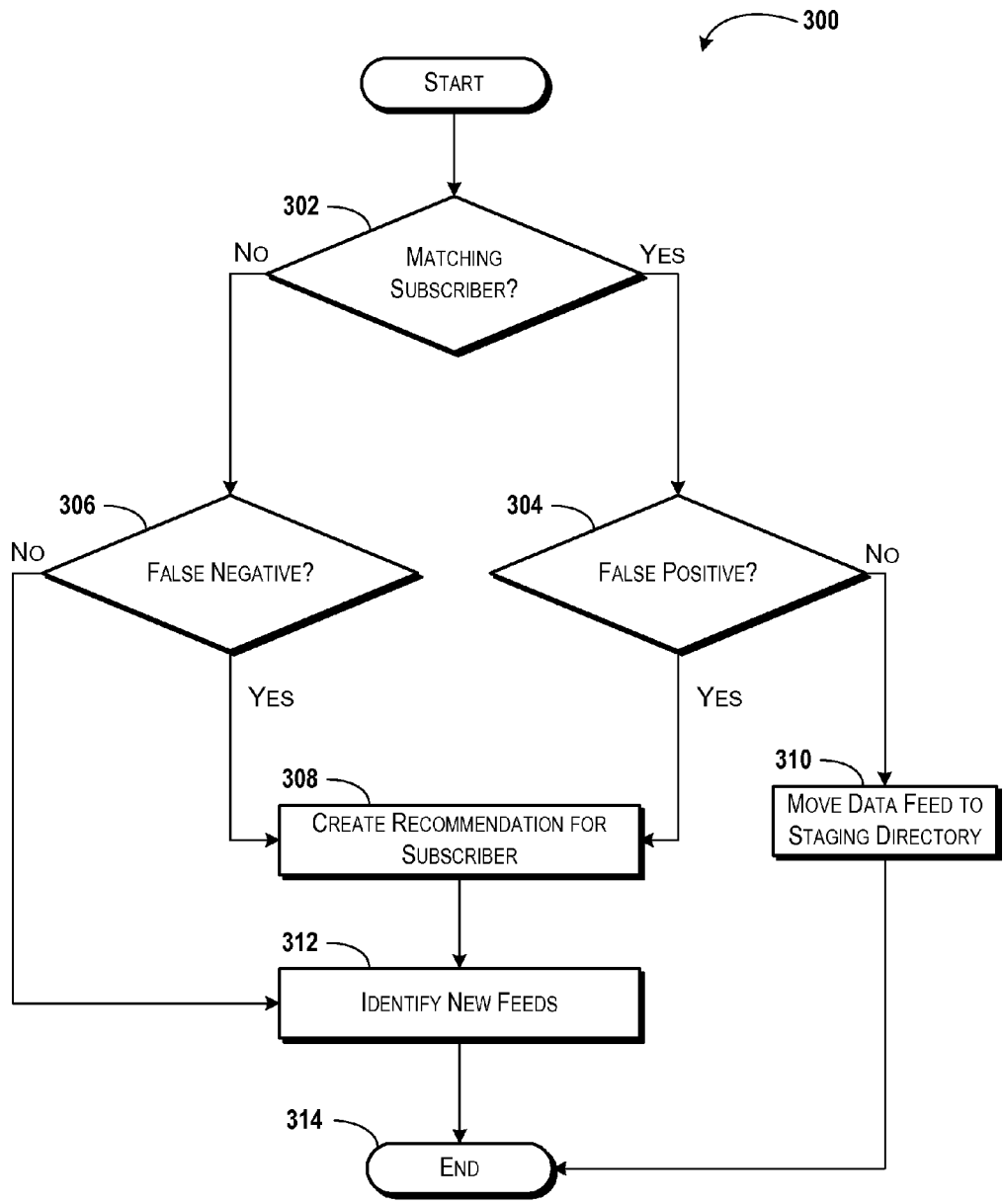
FIG. 3 is a flow diagram showing aspects of a method for classifying and analyzing data feeds, according to an illustrative embodiment.

Turning now to FIG. 3, aspects of a method 300 for classifying and analyzing the data feeds 106 will be described in detail, according to an illustrative embodiment. The method 300 is described as being performed by the feed management system 108. It should be understood from the description of FIG. 1 that the method 300 can be performed by the feed management system 108 via execution of one or more application programs including, but not limited to, the feed classifier 110, the feed analyzer 112, the logging system 114, and/or the feed delivery module 116. Furthermore, it should be understood that the functionality described herein with regard to the method 300 can be, but is not necessarily, provided by the feed management system 108 at operation 204 of the method 200 described above. As such, the method 300 can begin after operation 202 of the method 200 and can flow to the operation 206 of the method 200 after terminating. It should be understood that these embodiments are illustrative, and should not be construed as being limiting in any way.

The method 300 begins at operation 302, wherein the feed management system 108 determines if the data feed 106 received at operation 202 or obtained from the landing directory 120 has a matching or mapped subscriber 126. As explained above, the determination of operation 302 can be performed based upon one or more filenames of the data feed 106, in some embodiments. The determination of operation 302 also can be performed based upon the mapping stored by the feed management system 108, if desired.

If the feed management system 108 determines, in operation 302, that a matching subscriber 126 exists for the data feed 106, the method 300 proceeds to operation 304. If the feed management system 108 determines, in operation 302, that no matching subscriber 126 exists for the data feed 106, the method 300 proceeds to operation 306.

At operation 304, the feed management system 108 determines if the subscriber 126 to which the data feed 106 was mapped in operation 302 corresponds to a false positive match. As explained above, the feed management system 108 can perform additional analysis of the data feed 106 to determine if the data feed 106 has been properly associated with the subscriber 126. For example, the feed management system 108 can compare the data feed 106 to other data feeds 106 in the staging directory 122 associated with the subscriber 126 determined to match the data feed 106 in operation 302. The additional analysis of the data feed 106 can include, but is not limited to, analyzing the data structure within the data feed 106, the filename of the data feed 106, and/or data structures and filenames of data feeds 106 in the staging directory 122. If the feed management system 108 recognizes a mismatch, the feed management system 108 can identify the matching of the subscriber 126 to the data feed 106 as a probable false positive match, and the method 300 can proceed to operation 308, which is described in more detail below. If the feed management system 108 determines, in operation 304, that the determination in operation 302 was not a false positive match, the method 300 proceeds to operation 310, wherein the feed management system 108 moves the data feed 106 to the staging directory 122 associated with the subscriber 126 identified in operation 302.

Returning now to operation 306, the feed management system 108 can be configured to determine if the failure to match the data feed 106 to a subscriber 126 in operation 302 corresponds to a false negative. As explained above, the feed management system 108 can perform additional analysis of the data feed 106 to determine if the data feed 106 is associated with a particular subscriber 126. For example, the feed management system 108 can compare the data feed 106 to other data feeds 106 in any of the staging directories 122. As explained above, the additional analysis of the data feed 106 can include, but is not limited to, analyzing the data structure of the data feed 106 and/or the filename of the data feed 106, and comparing the data structure and/or filename of the data feed 106 to data structures and filenames of data feeds 106 in other staging directories 122.

If the feed management system 108 recognizes a match during the analysis in operation 306, for example, if the feed management system 108 identifies a matching staging directory 122, and therefore the failure to match the subscriber 126 associated with the matching staging directory 122 as a probable false negative, the method 300 can proceed to operation 308, which is described in more detail below. If the feed management system 108 determines, in operation 306, that the determination in operation 302 was not a false negative, the method 300 proceeds to operation 312, which is described in more detail below.

At operation 308, the feed management system 108 creates one or more recommendations or suggestions for delivery to one or more subscribers 126 or other entities. As explained above in detail, the feed management system 108 can be configured, in some embodiments, not to move data feeds 106 to staging directories 122 in response to identifying false negatives or false positive matches. Instead, various implementations of the concepts and technologies disclosed herein include generating recommendations or suggestions for the subscribers 126 or other entities. As such, the subscribers 126 or other entities can modify mapping information to modify how data feeds 106 are mapped to the subscribers to confirm or reject determined false positive matches and/or false negatives before these determinations are acted upon by the feed management system 108.

From operation 308, or from operation 306 if the feed management system 108 determines that a failure to match a subscriber 126 does not result from a false negative, the method 300 proceeds to operation 312. Additionally, though not illustrated in FIG. 3, the method 300 can proceed to operation 312 from operation 310 and/or can be executed by the feed management system 108 at various times for other purposes. At operation 312, the feed management system 108 identifies new data feeds 106. As explained above, the feed management system 108 can be configured to determine if false negatives or false positive matches result from creation of a new data feed 106.

From operation 312, the method 300 proceeds to operation 314. Similarly, the method 300 can proceed to operation 314 from operation 310, in some embodiments. The method 300 ends at operation 314.

Figure 4:
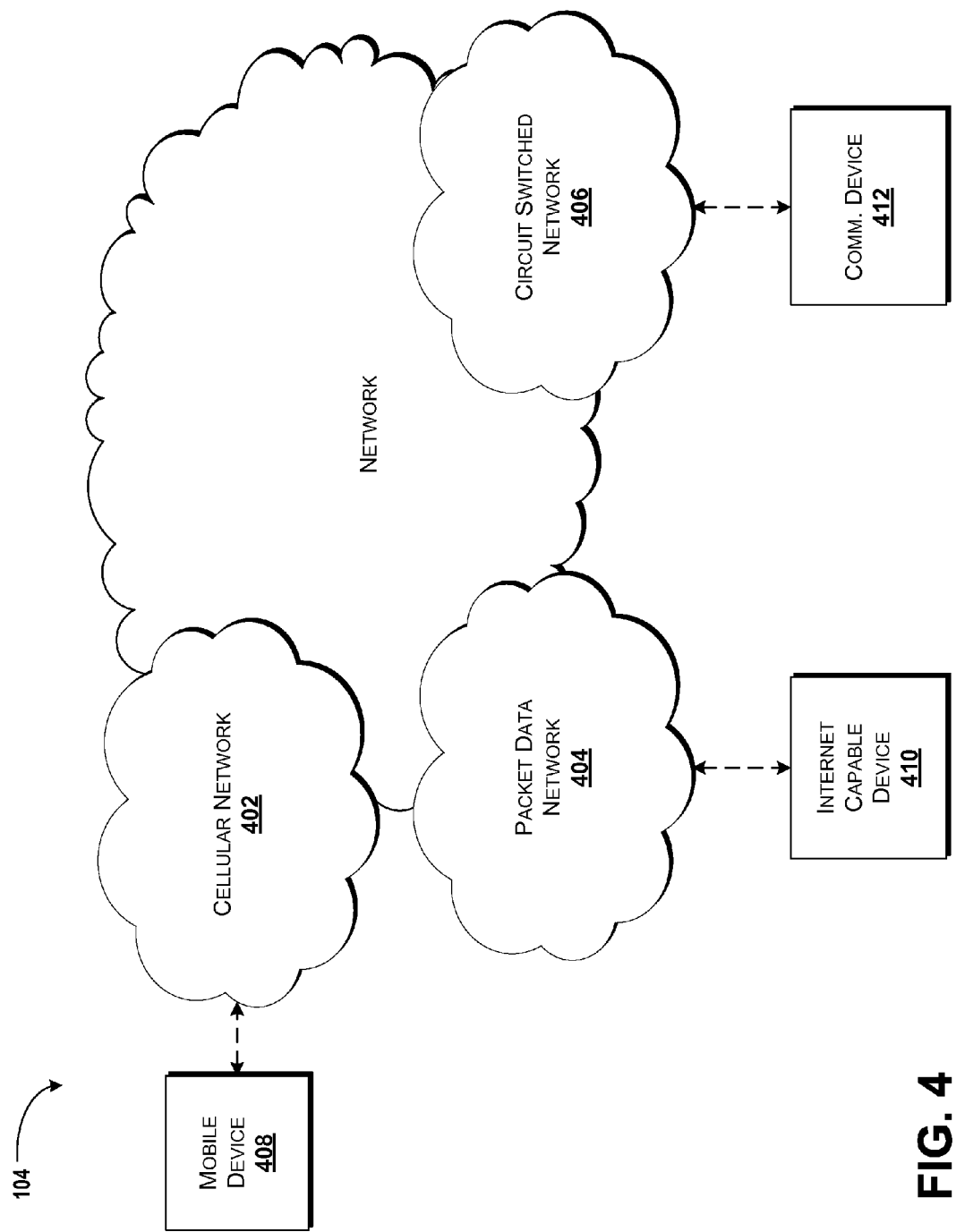
FIG. 4 schematically illustrates a network, according to an illustrative embodiment.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTS's"), Node-B's or e-Node-B's, base station controllers ("BSC's"), radio network controllers ("RNC's"), mobile switching centers ("MSC's"), mobile management entities ("MME's"), short message service centers ("SMSC's"), multimedia messaging service centers ("MMSC's"), home location registers ("HLR's"), home subscriber servers ("HSS's"), visitor location registers ("VLR's"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSUPA), and HSPA+. The cellular network 402 also is compatible with 4G mobile communications standards as well as evolved and future mobile standards.

The packet data network 404 includes various devices, for example, servers, computers, databases, and other devices in communication with another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

FIG. 5 is a block diagram illustrating a computer system 500 configured to provide data feed management in accordance with various embodiments of the concepts and technologies disclosed herein. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may further include the feed classifier 110, the feed analyzer 112, the logging system 114, the feed delivery module 116, and/or other modules and/or application programs. In some embodiments, the feed classifier 110, the feed analyzer 112, the logging system 114, and/or the feed delivery module 116 are embodied in computer-readable media containing instructions that, when executed by the processing unit 502, perform one or more of the methods 200 or 300 for data feed management described in detail in FIGS. 2 and 3 and/or additional functionality of the feed management system 108 described herein. According to embodiments, the program modules 516 may be embodied in hardware, software, firmware, or any combination thereof. The memory 504 also can store the landing directories 120, the staging directories 122, the receipts 124, and/or the feed archives 130.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof, does not include waves, signals, and/or other transitory and/or intangible communication media, per se.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. In some embodiments, the computer system 500 communicates with the archiver 128 via the network devices 510, though this is not necessarily the case. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for data feed management have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

We claim:

1. A method comprising:
receiving, at a processor executing data feed analyzer, a data feed at a landing directory associated with a feed management system;
mapping, by the processor, the data feed at the landing directory to a subscriber, wherein mapping the data feed comprises determining if the landing directory is associated with the subscriber;
if a determination is made that the landing directory is associated with the subscriber, determining, by the processor, if matching the subscriber to the landing directory corresponds to a false positive match by
analyzing, by the processor, the data feed,
comparing, by the processor, the data feed to a further data feed in a matched staging directory associated with the matched subscriber, and
determining, by the processor, that the data feed and the further data feed do not share a filename format and a data structure;
if a determination is made that the landing directory is not associated with the subscriber, determining, by the processor, if the failure to match the subscriber to the landing directory corresponds to a false negative;
moving, by the processor, the data feed to a staging directory associated with the subscriber; and
attempting, by the processor, to deliver the data feed to the subscriber via the staging directory.

2. The method of claim 1, further comprising in response to detecting delivery of the data feed to the subscriber:
storing data indicating delivery of the data feed; and
archiving the data feed.

3. The method of claim 2, wherein the data feed is archived at an archiver in communication with the feed management system.

4. The method of claim 1, further comprising in response to detecting a failed delivery of the data feed, placing the data feed in a delivery queue associated with the subscriber for another delivery attempt.

5. The method of claim 1, further comprising creating a recommendation for the matched subscriber in response to determining that the matched subscriber corresponds to the false positive match, the recommendation comprising a suggestion to remove an association associating the data feed with the matched subscriber.

6. The method of claim 5, further comprising determining if the data feed corresponds to a new data feed.

7. The method of claim 1, wherein determining if failure to identify the matched subscriber corresponds to the false negative comprises:
analyzing the data feed;
comparing the data feed to a further data feed in a further staging directory associated with a further subscriber; and
determining that the data feed and the further data feed share a filename format and a data structure.

8. The method of claim 7, further comprising creating a recommendation for the subscriber in response to determining that the failure to identify the matched subscriber corresponds to the false negative, the recommendation comprising a suggestion to add an association associating the data feed with the further staging directory.

9. The method of claim 1, further comprising moving the data feed to the matched staging directory, in response to determining that the matched staging directory does not correspond to the false positive match.

10. A system comprising:
a processor; and
a memory that stores computer executable instructions that, when executed by the processor, cause the processor to perform comprising:
receiving a data feed at a landing directory associated with a feed management system;
mapping the data feed at the landing directory to a subscriber in communication with the feed management system, wherein mapping the data feed comprises determining if the landing directory is associated with the subscriber;
if a determination is made that the landing directory is associated with the subscriber, determining if matching the subscriber to the landing directory corresponds to a false positive match by
analyzing the data feed,
comparing the data feed to a further data feed in a matched staging directory associated with the matched subscriber, and
determining that the data feed and the further data feed do not share a filename format and a data structure;
if a determination is made that the landing directory is not associated with the subscriber, determining, by the processor, if the failure to match the subscriber to the landing directory corresponds to a false negative;
moving the data feed to a staging directory associated with the subscriber;
adding the data feed to a delivery queue associated with the subscriber;
attempting to deliver the data feed to the subscriber via the staging directory;
in response to detecting a failure to deliver the data feed to the subscriber, retaining the data feed in the delivery queue; and
in response to detecting delivery of the data feed to the subscriber, storing a receipt comprising data indicating delivery of the data feed.

11. The system of claim 10, further comprising instructions that, when executed by the processor, cause the processor to perform operations further comprising:
archiving the data feed at the archiver in communication with the feed management system;
receiving a subscription request from a further subscriber; and providing the data feed to the subscriber, in response to receiving the subscription request.

12. The system of claim 10, further comprising instructions that, when executed by the processor, cause the processor to perform operations further comprising creating a recommendation for the matched subscriber in response to determining that the matched subscriber corresponds to the false positive match, the recommendation comprising a suggestion to remove an association associating the data feed with the matched subscriber.

13. The system of claim 10, further comprising instructions that, when executed by the processor, cause the processor to perform operations further comprising creating a recommendation for the matched subscriber in response to determining that the failure to identify the matched subscriber corresponds to the false negative, the recommendation comprising a suggestion to add an association associating the data feed with the further staging directory.

14. A method comprising:
receiving, by a processor executing a data feed at a landing directory associated with a feed management system;
mapping, by the processor, the data feed at the landing directory to a subscriber in communication with the feed management system, wherein mapping the data feed comprises determining if the landing directory is associated with the subscriber;
if a determination is made that the landing directory is associated with the subscriber, determining, by the processor, if matching the subscriber to the landing directory corresponds to a false positive match by analyzing, by the processor, the data feed,
comparing, by the processor, the data feed to a further data feed in a matched staging directory associated with the matched subscriber, and
determining, by the processor, that the data feed and the further data feed do not share a filename format and a data structure;
if a determination is made that the landing directory is not associated with the subscriber, determining, by the processor, if the failure to match the subscriber to the landing directory corresponds to a false negative;
moving, by the processor, the data feed to a staging directory associated with the subscriber;
adding, by the processor, the data feed to a delivery queue associated with the subscriber;
attempting, by the processor, to deliver the data feed to the subscriber, the data feed being delivered to the subscriber according to a delivery schedule determined based upon a responsiveness of the subscriber;
in response to detecting a failure to deliver the data feed to the subscriber, retaining, by the processor, the data feed in the delivery queue for a further delivery attempt; and
in response to detecting delivery of the data feed to the subscriber, storing, by the processor, a receipt comprising data indicating delivery of the data feed.

15. The method of claim 14, wherein the delivery schedule is based, at least partially, upon:
a group of subscribers to which the subscriber belongs; and
a delivery algorithm associated with the group of subscribers.

16. The method of claim 14, wherein the delivery schedule comprises delivering the data feed in an order in which the data feed is received at the feed management system.

* * * * *